United States Patent Office 3,455,623
Patented July 15, 1969

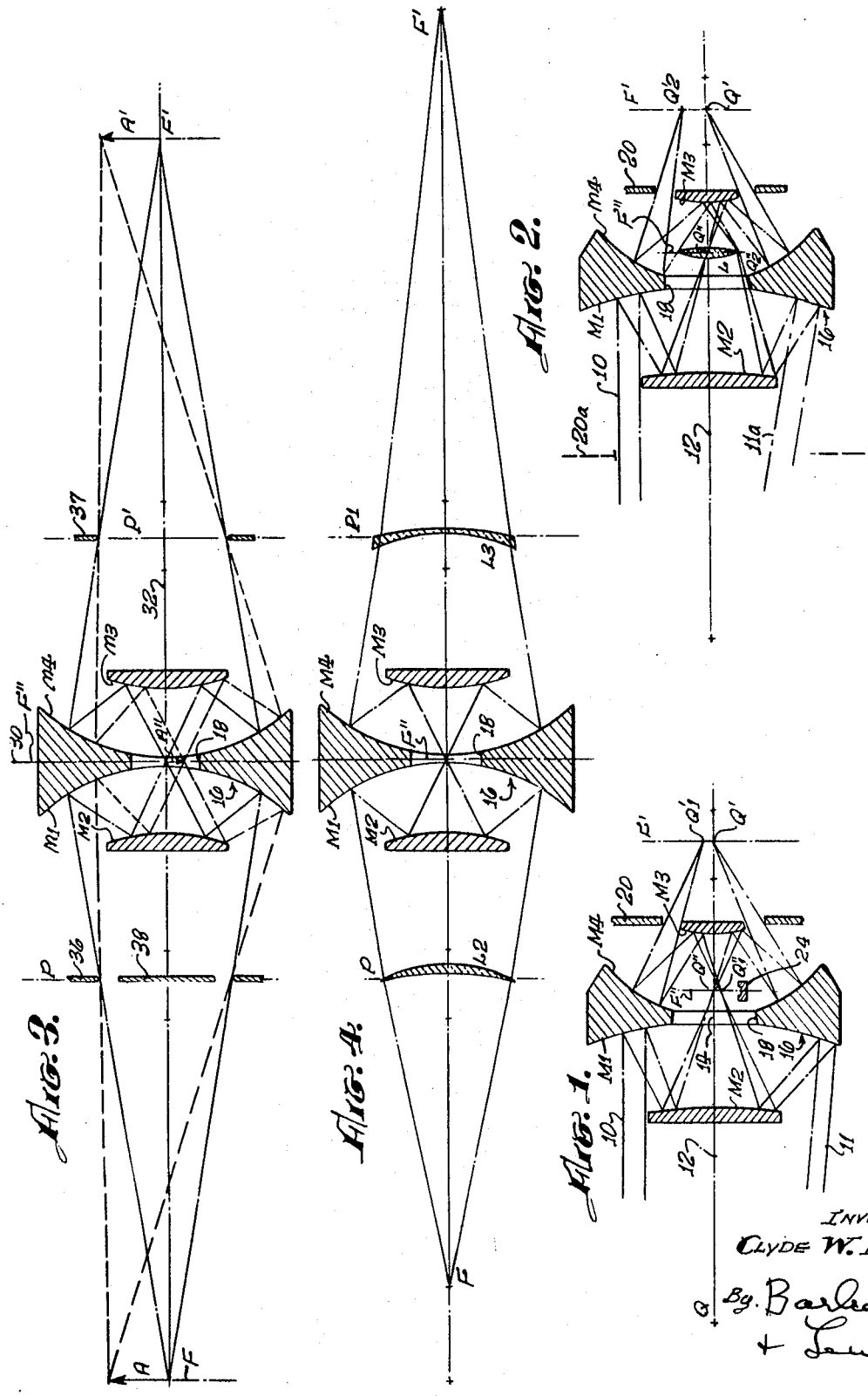

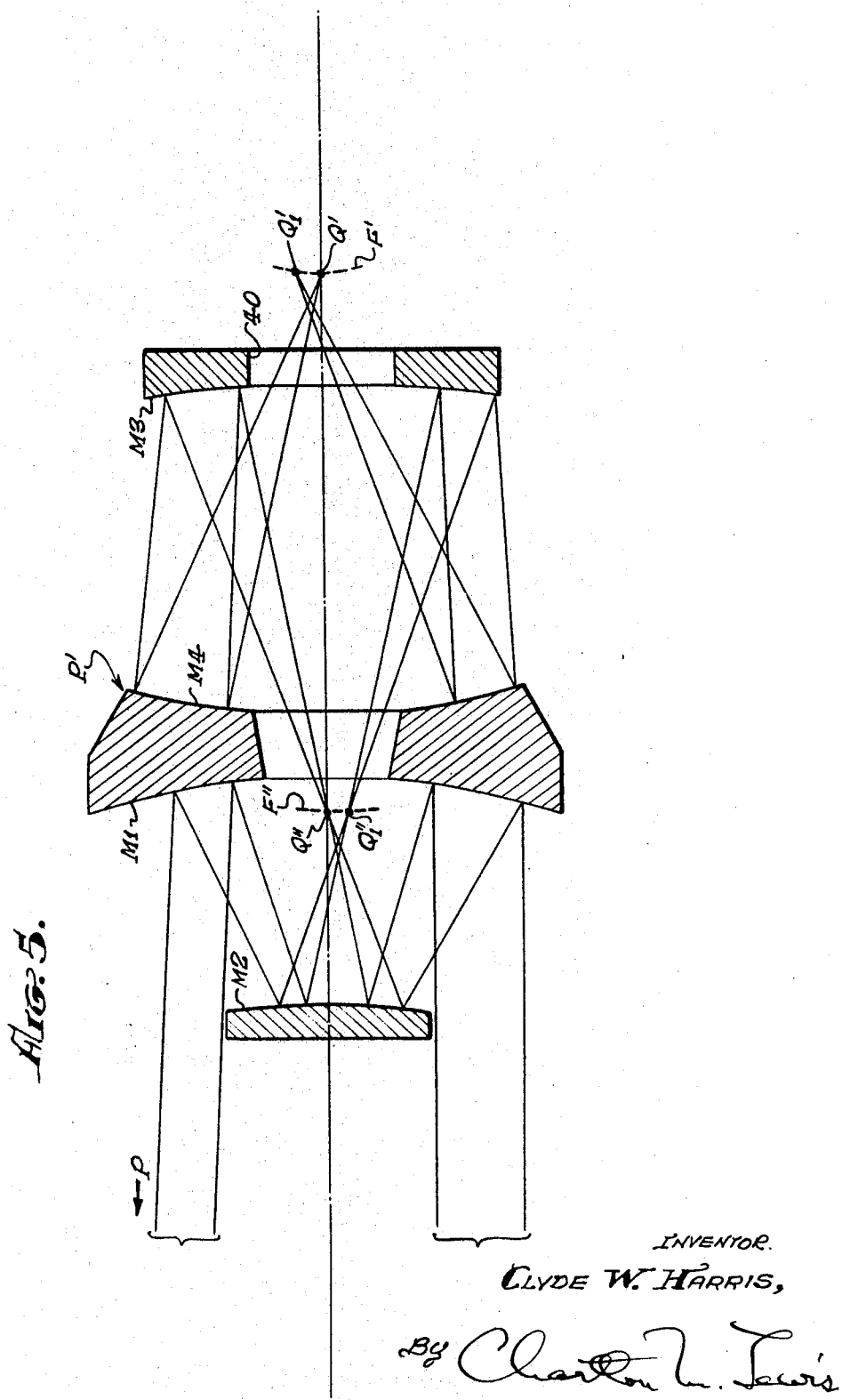

3,455,623
OPTICAL OBJECTIVE FORMING AN INTERMEDIATE IMAGE AND HAVING PRIMARY AND SUBSIDIARY CONJUGATE FOCAL PLANES
Clyde W. Harris, Santa Barbara, Calif., assignor to The Te Company, Santa Barbara, Calif., a corporation of California
Continuation-in-part of application Ser. No. 476,412, Aug. 2, 1965. This application Mar. 4, 1966, Ser. No. 536,539
Int. Cl. G02b 17/08
U.S. Cl. 350—55        15 Claims

ABSTRACT OF THE DISCLOSURE

Four spheroidal reflective surfaces are axially aligned to form an anastigmat, with light passing from the second to the third surface through central apertures in the first and fourth surfaces. The system is further characterized by forming an approximate image of the primary focal surfaces at an intermediate focal surface between the second and third reflective surfaces, permitting great reduction of the size of the apertures in the first and fourth surfaces as compared with prior systems. In addition to its primary conjugate focal surfaces the system has subsidiary conjugate focal surfaces that are mutually imaged without intermediate image formation. Those surfaces are available for entrance and exit pupils. Also, refractive elements of effectively equal and opposite powers may be placed at those surfaces, and may be differently bent to correct spherical aberration, without compromising the inherent quality of the reflective system as a superachromat.

---

This invention is a continuation in part of my copending application, filed in the U.S. Patent Office on Aug. 2, 1965, Ser. No. 476,412, under the same title, now abandoned.

This invention has to do with optical systems for forming real images having good optical quality. Such objective systems are useful for photography, photometric devices, optical tracking and many related purposes.

More particularly, the objectives of the present invention combine high light-gathering power with the capability for excellent optical correction.

An important object of the invention is to provide a fully practical anastigmat that has the complete freedom from chromatic aberrations that is characteristic of reflective rather than refractive optical elements.

In one of its aspects the invention utilizes reflective optics exclusively. There is then absolutely no chromatic aberration, and the system may be used in spectral regions where suitable refractive media are difficult or impossible to obtain. By providing four successive coaxial reflective surfaces, each of which may be spherical or non-spherical, the invention makes available a sufficiently large number of design variables to permit effective correction of coma, astigmatism, spherical aberration and distortion, even in systems of relatively high numerical aperture.

The invention further provides a reflective anastigmat of the described type that is highly flexible in design, especially with respect to the selection of conjugate focal distances, placement of entrance and exit pupils, and provision of relatively large back focus.

For accomplishing those purposes the invention utilizes four coaxial spheroidal reflective surfaces to successively reflect light incident from object space, the first and fourth surfaces being centrally apertured concave surfaces arranged back to back, and the second and third surfaces spacedly opposing the respective first and fourth surfaces. The light passes between the second and third surfaces through the apertures in the first and fourth surfaces. The second and third reflective surfaces are normally convex and need not be apertured, though their central portions are generally not used and may be cut away if desired. It is to be understood, of course, that light can pass in either direction through an objective. Since "image" and "object" are interchangeable, use of such terms is only for clarity of description and is not intended as a limitation upon the invention.

A serious disadvantage of previously available systems of the described general type has been the extreme vignetting of the light beam by the reflective elements themselves. Even at extreme values of the geometrical numerical ratio, such vignetting has typically reduced the effective light gathering power so severely as to render such systems entirely inoperative for many purposes and to deprive them of practical interest even in the narrow range of their potential operation.

Those difficulties are well illustrated in Patent 2,327,947 to Arthur Warmisham, which describes two distinct types of configuration. One, which is illustrated in FIGS. 1 and 3 of the patent and is superficially similar to the systems of the present invention, is conceded by the patentee to be incapable of effectively imaging distant objects. The other configuration, shown by Warmisham in FIGS. 2 and 4, employs small convex mirrors in the first and fourth positions and relatively large concave mirrors of annular form in second and third positions. Such a system involves serious additional difficulties. In particular, the overall diameter of the system is far greater than that of the effective aperture, making the system unreasonably large and heavy for given focal length and light gathering power. This type of system is also limited to a back focus that is too short for many practical purposes.

An important property of an objective in accordance with the present aspect of the invention is that the paraxial radii of curvature and the mutual axial separations of the successive surfaces are so selected that light passing through the system between two conjugate focal surfaces in object and image space, respectively, forms a real image of those focal surfaces at an intermediate focal surface between the second and third reflective surfaces of the system. Existence of an intermediate focal surface in which such a real image is formed is a distinctive property of the invention. However, the image formed in that intermediate focal surface is typically of inferior optical quality and may be described as an approximate image. An important feature of the invention is the recognition that suitable design can most effectively reduce or eliminate aberrations in the mutual imaging of any selected pair of conjugate focal surfaces for the overall system if the optical quality of the intermediate image is substantially or completely neglected.

Despite the approximate character of the described intermediate image, its presence is highly advantageous. Presence of the intermediate image permits the convex reflective surfaces to have smaller curvature than in systems without such an image. The weaker negative elements generate less aberration, and their power is more suitable for obtaining zero Petzval sum for the system.

Furthermore, especially for the limited field angles that are normally of interest, such an intermediate image is typically of quite small size, so that the cross section of the light beam at the intermediate focal surface is correspondingly small. By designing the system with the intermediate focal surface close to the vertices of the first and fourth reflective surfaces of the system, the central apertures in those surfaces can therefore be quite small. The present systems thereby avoid the severe loss of light caused in previous systems by excessively large central apertures.

Formation of an intermediate and relatively small real image further provides a convenient and effective point in the system for mounting such optical elements as light filters, focal correctors, scanning devices, polarizing devices, image rotators or translators, and the like which are sometimes of strictly limited size. With conventional objectives such elements can sometimes be employed only by providing a train of two objectives, both highly corrected.

When the remarkably large back focus of which the invention is capable is not required, it is sometimes advantageous to make either the second or third reflective surface of annular form, as well as the first and second surfaces. The paraxial radii of curvature and the axial spacing of the elements can then be so selected that light proceeding from the object to the first surface passes through the aperture in the second reflective surface, or so that the light passes through the aperture in the third surface in proceeding from the fourth surface to the final image. That configuration tends to facilitate improved definition and to reduce vignetting. When both the image and object are at finite distances, both the second and third reflective surfaces may be apertured, so that all four reflectors are annular. Direct light between the object and image is then blocked by one or more screens placed at suitable positions on the axis.

In accordance with a further aspect of the invention, a refractive lens may be located substantially or exactly at the intermediate image surface. Such a lens is useful for shifting the positions of the entrance and exit pupils and for controlling the chief rays through the system, allowing further reduction of the vignetting. Such a lens also contributes to the Petzval sum for the system, facilitating the control of field curvature. A lens at the intermediate focus is imaged directly onto the final image plane, and introduces no chromatic aberration regardless of the dispersion of the lens material.

A further advantage of the described intermediate focal surface has to do with placement of the entrance and exit pupils of the system. A system of the present type has been found to have, in addition to the described system of conjugate focal planes which are mutually imaged with formation of an intermediate real image, a further system of subsidiary conjugate focal surfaces that represent real images of each other and are mutually imaged without such intermediate image formation. Such subsidiary conjugate focal surfaces are available as entrance and exit pupils. Their location is quite flexibly controllable, but they are typically located physically outward of all reflective surfaces, that is, in object and image space, respectively, and are then conveniently accessible for aperture definition.

It may be noted that an object and its image in the main conjugate focal surfaces of the system as a whole are mutually erect, whereas the mutual imaging of the auxiliary conjugate focal planes involves inversion. The ability of the system as a whole to produce an erect image is advantageous for certain applications.

A further important aspect of the present invention permits insertion of additional refractive elements in reflective systems of the described type without introduction of chromatic aberration. That is accomplished by placing two elements having suitably related powers and preferably formed of identical material at any pair of the described subsidiary conjugate focal surfaces, typically at the mutually conjugate entrance and exit pupils of the system. Such lenses are effectively superposed optically upon each other. If their respective powers are opposite in sign and effectively equal in magnitude, they cancel each other out with respect to any chromatic effect. Such lenses may, for example, be differently bent in such a way as to correct spherical aberration for the system, thereby freeing other design variables for control of aberrations that could not otherwise be handled.

It will be recognized that refractive elements of the type just described, as well as those placed at the intermediate focus of the system, are entirely different in concept from the conventional refractive correcting elements of a focal form such as the Schmidt corrector for spherical aberration of a spherical mirror element or system. An important feature of the present refractive elements is that the system remains a superachromat in the technical sense of the word. On the other hand, a conventional element such as a Schmidt plate, even if "achromatized" by use of glass types having different dispersive properties, necessarily introduces a certain amount of residual or higher order chromatic aberration due to the imperfect coordination of the dispersion curves.

A full understanding of the invention and of its further objects and advantages will be had from the following description of illustrative manners in which it may be carried out. The particulars of that description, and of the accompanying drawings which form a part of it, are intended only as illustration, and not as a limitation upon the scope of the invention, which is defined in the appended claims.

In the drawings:

FIG. 1 is a schematic drawing representing an illustrative objective in accordance with the invention, intended especially for imaging a distant object;

FIG. 2 is a schematic drawing corresponding to FIG. 1 and representing a modification;

FIG. 3 is a schematic drawing representing another embodiment of the invention, intended especially for imaging an object at approximately unit magnification;

FIG. 4 is a schematic drawing corresponding to FIG. 3 and representing a modification; and FIG. 5 is a schematic drawing representing a further embodiment of the invention.

As represented illustratively in FIG. 1, incoming parallel light 10, as from an infinitely distant object Q on the axis 12, is reflected successively by the four coaxial spheroidal reflective surfaces M1, M2, M3 and M4. The first and fourth surfaces M1 and M4 are concave annular surfaces with central light transmitting apertures. Those surfaces are arranged back to back with a common vertex 14 on axis 12, and are typically, but not necessarily, formed on opposite faces of a common member 16. As shown, the surface apertures are formed by a physical opening 18 in member 16. Second and third reflective surfaces M2 and M3 are convex surfaces arranged in coaxial relation facing the respective concave surfaces M1 and 4M. As clearly shown in FIG. 1, incoming light at 10 parallel to axis 12 and oblique light at 11 is reflected by M2 through the apertures in M1 and M4 to the most rearward element M3.

The radii of curvature of the four reflective surfaces, or, if they are not spherical, their paraxial radii of curvature (the radii of their osculating spheres at the axis) and the mutual axial spacings of those surfaces are so chosen that the incoming beams of parallel light indicated at 10 and 11 not only form main images Q' and $Q_1'$ in the principal focal surface F' of the system, but form approximate intermediate real images Q" and $Q_1''$ in the intermediate focal surface F" between reflective surfaces M2 and M3. In the present instance that intermediate focal surface is slightly back of the vertex 14 but close enough to that vertex so that the beam diameter is quite small at aperture 18. The size of that aperture can be correspondingly small, especially if the angular field to be covered by the objective is not large.

An important feature of the present invention is that the design variables of the system are selected for optimizing the optical quality of the final image at F' substantially without regard to the nature of the intermediate image at F". In particular, the Petzval condition for flatness of field can readily be met for the system as a whole although the intermediate focal surface F" is typically far from plane.

In preferred form of the invention, one or more of the spheroidal surfaces M1 to M4 are nonspherical surfaces of revolution with respect to axis 12, the generating curves for such surfaces being designed in accordance with the known laws of optics to reduce or eliminate selected optical aberrations of the overall system such as spherical aberration, coma, astigmatism and distortion. Since the respective forms of all aspheric surfaces are selected entirely for optimizing the optical quality of the final image at Q' in whatever respects may be desired, the aberrations that would be present in image Q'' with spherical surfaces are typically not reduced and may even be increased.

Table 1 gives illustrative system parameters on a unit focal length basis for the general configuration shown in FIG. 1 with surfaces M1, M2 and M4 aspheric, based on computer analysis for a fifth order intermediate solution.

TABLE 1

Aperture: 1.0
Speed: Geometrical, f1.0; effective, T/1.5
Petzval curvature=0
Fractional distortion=.0066447

| Surface | Curvature | Radius | Deformation coefficients | Distances to next surface |
|---|---|---|---|---|
| 1 | −0.50000 | 2.0000 | +0.013095 $Y^4$+0.00500 $Y^6$ | −0.5 |
| 2 | −0.25000 | 4.0000 | +0.066067 $Y^4$ | 1.0 |
| 3 | 1.50000 | 0.6667 |  | −0.5 |
| 4 | 1.25000 | 0.8000 | +.004389 $Y^4$+0.01600 $Y^6$ | 1.000 |

The inherent flexibility of design in systems of the present type is illustrated by the fact that the system of Table 1 was designed to have an effective focal length equal to the distance from the fourth surface to the focus. For a small field this makes the fourth mirror equal in diameter to the entrance aperture.

FIG. 1 further illustrates introduction of an aperture stop 20 at a position in object space that is particularly advantageous under special circumstances. For example, in the imaging of thermal sources it is desirable that the optical image formed by the system be completely surrounded by surfaces that can be refrigerated. Both stop 20 and mirror M3 can conveniently be maintained at low temperature, together with all other walls of the space surrounding image Q'. The image is then exposed to a higher temperature only through the annular space between M3 and stop 20. That space is fully occupied by the incoming radiation, not only for image points on the axis but also for such off-axis image points as $Q_1'$. Thus the described stop placement affords maximum efficiency in cooling the environment of the image. The fact that the present system configuration is capable of design with such placement of the aperture stop illustrates its design flexibility and constitutes a marked practical advantage.

Although the intermediate image at F'' is typically of inferior optical quality, as already explained, it affords a position at which the cross section of the light beam goes through a minimum. It therefore provides a highly convenient point at which to insert auxiliary optical elements or systems such as filters and the like. That is illustrated in FIG. 1 by the holder 24, represented in the form of a track on which a variety of elements may be mounted in the beam at its point of minimum diameter. In addition to optical filters, holder 24 may be utilized for mounting such elements as scanning mechanisms, polarizing devices, field stops, image rotators or translators for adjusting the position of final image Q', and means for adjusting the optical path length, as by means of a pair of relatively movable prisms of equal angle or the like.

In the structure of FIG. 1 the useful angular field is appreciably larger than that indicated by the oblique beam 11, but at higher field angles the illumination is progressively reduced by vignetting, primarily at M2 or M3. In accordance with a further aspect of the present invention, such vignetting can be effectively reduced, with significant increase in both the maximum useful field angle and the field angle over which full illumination is obtained. That is accomplished by inserting a refractive element at the intermediate focal surface F'' to adjust the positions of the entrance and exit pupils. FIG. 2 illustrates a single positive lens L at that position. Such a lens does not significantly affect the path of light initially incident parallel to the axis, as at 10, since such light passes through the approximate intermediate focus Q'' at the center of the lens. On the other hand, parallel light incident obliquely, such as that shown at 11a in FIG. 2, is brought approximately to an intermediate focus $Q_2''$ at a point of lens L offset from the axis and is deviated by an angle determined by the power of the lens. The magnitude of such deviation may be selected to increase markedly the useful field angle and also the angle at which vignetting sets in.

For clarity of illustration, FIG. 2 shows a system with the aperture stop 20 in the same position as in FIG. 2, and with the same effective focal length and other parameters, although in practice the reflective surfaces would be designed somewhat differently in presence of an intermediate lens, especially with respect to Petzval curvature. Incident beam 10 parallel to the axis and its axial image Q' are shown as in FIG. 1, the thickness of lens L being neglected. However, the oblique beam 11 of FIG. 1 has been arbitrarily replaced in FIG. 2 by the beam 11a at an angle with the axis about twice as great and thus corresponding to about twice the angular field represented in FIG. 1. Yet the image point $Q_2'$ receives from incident beam 11a essentially the same full illumination as axial image point Q'. Lens L thus increases the useful field angle and corresponding image size by a large factor. Moreover, since intermediate focal surface F'' is approximately a conjugate surface with respect to the principal focal surface F', dispersion in lens L does not introduce any significant chromatic aberration into the final image at F'. Hence the present aspect of the invention, though necessarily limited to a range of radiation frequencies for which a suitably transparent refractive material is available, does not require availability of a variety of such materials since the inserted lens element need not be achromatized. In fact, a single lens at focal surface F'' provides a degree of superachromatization that would not be obtainable by concentional achromatizing procedures, due to the limited dispersion characteristics of available materials even in the visible region. Lens L is shown as a simple thin lens with spherical surfaces, but refractive surfaces of any desired form may be used. Also, as with a conventional field lens in the common focal plane between two independently corrected objectives used as relay lenses, for example, the lens L may represent a compound lens which is virtually in the focal surface F'', but has all of its refracting faces spaced from that surface to avoid direct imaging of such faces in the final focal surface F' of the system.

Lens L modifies the mutual relations of entrance and exit pupils of the system, and may be considered as primarily controlling that relation. In FIG. 2 the effective entrance pupil for the system is indicated at 20a, which represents the image in object space of the diaphragm 20. Without lens L, as in FIG. 1, the corresponding entrance pupil is beyond the left-hand boundary of the drawing. By further increasing the power of L in FIG. 2, the mutually conjugate entrance and exit pupils may be positioned respectively in the planes occupied by mirrors M2 and M3.

FIG. 3 represents an illustrative objective in accordance with the invention for imaging an object at magnification close to unity. It will be understood, however, that systems in accordance with the invention can be designed for magnification throughout a continuous range of values that includes those illustrated in FIGS. 1 and 3. In the present figure the object A and its image A' are shown in the conjugate planes F and F' for unit magnification. For that purpose the reflective surfaces may conveniently be made symmetrical with respect to the plane 30 perpendicular to axis 32. Thus, the two concave surfaces M1 and M4 are identical and the two convex surfaces M2 and M3 are also identical. The Petzval condition for flat field then requires that the curvatures of all reflective surfaces be the same. The distance $u$ from median plane 30 to each of the conjugate planes F and F' for unit magnification with intermediate image formation in plane 30 is then given by:

$$u = \frac{2DR(D+R)}{4D^2 + 2DR - R^2}$$

where R is the paraxial radius of curvature of each of the reflective surfaces and D is the axial separation of the vertices of M1 and M2 (and also of M3 and M4). In the illustrative system of FIG. 3, $D = 3R/8$. The intermediate image A'' is typically only an approximate image, as in the system previously described, the reflective surfaces being preferably aspherical and figured for optimum reduction of aberrations for the conjugate focal planes F and F' without regard for the quality of the intermediate image.

A convenient position for placement of aperture stops in the system of FIG. 3 is at the subsidiary conjugate focal planes of unit magnification indicated at P and P'. Those planes are mutually imaged in each other, but without formation of any intermediate image corresponding to A'' and also without the substantial freedom from aberrations that is characteristic of primary conjugate focal surfaces F and F'. Physical stops 36 and 37 are indicated in the planes P and P', which thus become the entrance and exit pupils of the system. Indicated in the figure are the resulting limiting rays for both paraxial and typical off-axis corresponding points of the object A and the image A'. Those rays also illustrate the nature of the mutual imaging of pupils P and P', all rays between corresponding points of those pupils being essentially mutually parallel between M2 and M3. Diaphragms 36 and 37 may include inner coaxial disks, as indicated at 38 for diaphragm 36, which limit the pupil to an annular form. If such disks are omitted, the effective beam is, of course, still generally annular, being limited internally by element M2, and typically also by M3 which fails to intercept some rays reflected by M2 and physically blocks other rays after reflection from M4. Such vignetting action may be partially or wholly controlled by insertion of a positive refractive element at intermediate focal surface F'', as already described in connection with lens L in FIG. 2, to shift the conjugate pupils in an appropriate manner. For example, the pupils may be made to coincide with M2 and M3, completely eliminating the particular type of vignetting just described.

In accordance with a further aspect of the invention, the presence of the subsidiary conjugate surfaces such as P and P' may be further utilized for insertion of refractive elements, as shown illustratively at L2 and L3 in FIG. 4, with complete avoidance of significant chromatic effects. Lenses for insertion in that manner are preferably of the same material, with respective powers of opposite sign and, for the present symmetrical system, equal in magnitude. Due to their position in conjugate surfaces of the system, those lenses are effectively superposed upon each other, so that their powers then cancel. That cancellation applies for all wavelengths, regardless of the dispersion of the glass or other material employed. The superachromatic nature of an all-reflective system is thereby maintained, while additional design variables are made available by the refractive elements. The two elements may have any desired respective forms that cancel out upon superposition, at least to the desired approximation, for elimination of chromatic errors. Whereas it is normally preferred to form both elements of the same material, different materials may be employed if the dispersion curves are suitably related to permit the desired power relationship to be maintained for all wavelengths employed, at least within the desired approximation. When complete elimination of chromatic aberration is not required the described preferred relationship between the powers of the two lenses may be relaxed, leading to correspondingly greater freedom of system design. It will be recognized that insertion of lenses such as L2 and L3 modifies the positions of the main conjugate focal surfaces of the system. For example, in the present system if optical symmetry is preserved within the reflective portion of the system the conjugate focal surface F in object space is moved closer by the positive power of L2, and F' is moved further away by the negative power of L3.

Whereas such refractive elements may be of any desired form, and may be placed, in principle, at any pair of the described subsidiary conjugate focal surfaces, a particularly useful example is represented in FIG. 4. For clarity of illustration, the reflective surfaces in FIG. 4 are shown like those of FIG. 3, but with the respective lenses L2 and L3 taking the place of the simple diaphragms 36 and 37 at the entrance and exit pupils P and P'. Lens L2, as shown, is positive and L3 negative, the powers being equal in magnitude. However, the lenses are designed with different shape factors, selected to balance out the spherical aberration due to the reflective surfaces of the system. It will be noted that if the shape factors of both lenses are the same, that is, for example, if one is plano-concave and the other plano-convex with the plane faces oriented symmetrically, then the third order spherical aberration of the lenses will approximately cancel. Hence by bending one lens or the other, or both in opposite directions, spherical aberration of either sign can be introduced at will, and can readily be designed to reduce the overall spherical aberration of the system substantially to zero.

That manner of utilizing the refractive elements is especially useful in the present type of reflective system. A characteristic of that system is that with spherical components the spherical aberration is appreciable while the coefficients of the other abberations can be made quite small. By balancing out the spherical aberration with refractive elements, it is therefore possible, even with all spherical surfaces, to obtain optical quality that is entirely satisfactory for many purposes. On the other hand, by use of aspherical reflective surfaces in combination with refractive spherical correction excellent overall definition is attainable, since the aspherical surfaces are then all available for eliminating the already small aberrations other than spherical.

It will be recognized that refractive elements similar to L2 and L3 can be usefully introduced in non-symmetrical reflective systems, such, for example, as those of FIGS. 1 and 2, as well as in systems having symmetrical reflective configurations. For example, such lenses might be inserted in the system of FIG. 2 at the conjugate pupils represented by diaphragm 20 and its real image 20a. Since those pupils are mutually imaged at a magnification other than unity, the relative powers of the two lenses or lens systems are adjusted accordingly. Thus, if the entrance pupil is imaged at the exit pupil at magnification S, the power of the lens at the exit pupil preferably equals the negative of the power of the entrance pupil lens divided by $S^2$. In FIG. 2, the lens at 20 would thus have a power approximately four times that of the lens at 20a, and of opposite sign.

An intermediate lens, similar to L of FIG. 2, can also be employed in a symmetrical system such as that of FIG. 3 or FIG. 4, serving purposes entirely analagous to those already described. Such an intermediate lens may be used together with lenses at the conjugate pupils, but the described superachromatic characteristic of the system then does not obtain.

FIG. 5 represents a further illustrative embodiment of the invention in which the third refracting surface M3 is of annular form, with coaxial aperture 40 through which light passes from M4 to the focal surface F'. That configuration requires that F' be closer to the third surface than in FIG. 1, for example, reducing the back focus to more conventional proportions. However, the configuration of FIG. 5 has the advantage that the last two mirrors of the train form a relay system of very moderate magnification, approaching unity in the present instance, the third mirror sharing the power with the fourth. Smaller curvatures can therefore be used, tending to reduce aberrations and facilitating improved definition. Also, vignetting by the third mirror is virtually eliminated, increasing the useful field. This type of system is particularly effective where flatness of field is not required, or where a refractive field flattener may be used.

The particular embodiment shown covers a field of the order of 6° square without excessive vignetting, and works at a numerical aperture of $f/1.25$. Table 2 gives illustrative values for the paraxial radii of curvature, diameters and axial separations of the respective surfaces for a system having an effective focal length of unity.

TABLE 2

| Surface | Radius | Distances to next surface | Diameter |
|---|---|---|---|
| 1 | −0.4900 | −1.6000 | 1.00 |
| 2 | −1.3188 | +2.0000 | 0.44 |
| 3 | −0.7000 | −2.5000 | 0.75 |
| 4 | +0.9338 | +1.4792 | 0.85 |

The exit pupil is at the fourth reflecting surface. The entrance pupil is of the order of 10 before the first surface. The approximate intermediate image surface F″ is about 0.075 before the first vertex. The fourth reflecting surface M4 may serve as an aperture stop, or a physical stop may be provided to act on the light bundle proceeding from the third to the fourth surface. To obtain a desired degree of definition one or more of the surfaces are suitably figured, preferably with little or no regard for the intermediate image.

The already small vignetting of a system of the general type shown in FIG. 5 may be further reduced by placing a positive lens essentially at intermediate image surface F″ in the manner already described in connection with FIG. 2. A system of the present type may also be designed with refractive elements of opposite but corresponding power at selected conjugate focal surfaces that are mutually imaged without formation of an intermediate real image, in the manner described in connection with lenses L2 and L3 of FIG. 4. However, the present system offers an attractive alternative method of correcting spherical aberration. Placement of the aperture stop directly at either the third or fourth reflective surface allows spherical aberration to be corrected by suitable aspheric form of that surface.

The general configuration shown for M3 and M4 of FIG. 5 may be employed also for surfaces M1 and M2, surface M2 being typically increased in diameter, made concave rather than convex, and moved somewhat to the left of the position shown in FIG. 5. A coaxial aperture in M2 then accommodates light proceeding from object space to M1. Since all four mirrors are axially apertured in such a system, it is ordinarily necessary to block out direct light transmission along the axis between object and image space, as by one or more suitably placed screens. Such a system is useful for enlarger applications, particularly when the surfaces to be mutually imaged are both convex, as in the case, for example, when image intensifier tubes are to be optically coupled.

I claim:
1. An optical objective comprising in combination four spheroidal reflective surfaces aligned on an axis to successively reflect light incident from object space,
the first and fourth surfaces being concave reflective surfaces facing oppositely and arranged back to back and having central light transmitting apertures,
the second and third surfaces spacedly opposing the respective first and second surfaces,
said light passing from the second surface to the third surface through the apertures in the first and fourth surfaces,
the paraxial radii of curvature and the mutual axial spacings of said surfaces being so interrelated that the system has at least a pair of conjugate focal surfaces axially spaced in object and in image space, respectively, and that light passing through the system between corresponding points of said focal surfaces forms uncorrected real images of such points in an intermediate focal surface between the second and third surfaces.

2. An optical objective as defined in claim 1, and wherein the second and third reflective surfaces are convex and said light passes radially outside those surfaces between said conjugate focal surfaces and the first and fourth reflective surfaces, respectively.

3. An optical objective as defined in claim 1, and wherein at least one of the second and third reflective surfaces is concave and has a central light transmitting aperture through which said light passes between the opposing reflective surface and one of said conjugate focal surfaces.

4. An optical objective as defined in claim 1, and wherein a plurality of said reflective surfaces are nonspherical surfaces for which the respective departures from their osculating spheres are chosen to correct optical aberrations in the mutual imaging of said conjugate focal surfaces without reference to the optical quality of the images in said intermediate focal surface, the last said images being only approximate.

5. An optical objective as defined in claim 1, and having subsidiary conjugate focal surfaces located respectively in object space and in image space inward of the respective first said conjugate focal surfaces and representing real images of each other,
said objective including also two refractive means arranged coaxially at the respective subsidiary conjugate focal surfaces of the system, the respective powers and materials of said refractive means being selected to substantially eliminate chromatic aberration.

6. An optical objective as defined in claim 5, and wherein said refractive means comprise respective lenses having shape factors selected to substantially balance the spherical aberration due to said reflective surfaces in the mutual imaging of the first said conjugate focal surfaces.

7. An optical objective as defined in claim 5, and wherein
one lens is imaged at the other lens with magnification S,
and said lenses are both of the same material and have respective powers of opposite sign, the ratio of the power of said one lens to the power of said other lens having a magnitude substantially equal to $S^2$.

8. An optical objective as defined in claim 5, and wherein the reflective surfaces and lens positions are essentially symmetrical with respect to a plane perpendicular to the axis and intermediate the first and fourth reflective surfaces,
and said lenses are both of the same material and have respective powers that are substantially equal in magnitude and opposite in sign.

9. An optical objective as defined in claim 6, and wherein at least one of said reflective surfaces is nonspherical and of a form selected to reduce at least one optical aberration selected from the group consisting of coma, astigmatism and distortion with respect to the mutual imaging of the first said conjugate focal surfaces.

10. An optical objective as defined in claim 1, and wherein one of said conjugate focal surfaces is at infinity.

11. An optical objective as defined in claim 1, and including also a positive refractive lens element coaxially arranged substantially at said intermediate focal surface.

12. An optical objective as defined in claim 1, and having subsidiary conjugate focal surfaces located respectively in object space and in image space inward of the respective first said conjugate focal surfaces and representing real images of each other, the entrance and exit pupils of the system being positioned respectively at the subsidiary conjugate focal surfaces.

13. An optical objective comprising in combination a plurality of ordered spheroidal reflective surfaces arranged coaxially to receive light from object space and to deliver the light to image space after successive reflections in order from the respective reflective surfaces, the paraxial radii of curvature and the mutual axial spacings of said surfaces being so interrelated that said surfaces have at least one pair of primary conjugate focal surfaces in object space and image space, respectively, and that light passing between corresponding points of said focal surfaces forms uncorrected real images of such points in an intermediate focal surface, said reflective surfaces having also at least one pair of subsidiary conjugate focal surfaces located respectively in object space and in image space inwardly of said primary focal surfaces, said subsidiary conjugate focal surfaces representing real images of each other that are formed without formation of any intermediate real image, said objective including also two lenses arranged coaxially substantially at the respective subsidiary conjugate focal surfaces, said lenses having spherical surfaces and having selective shape factors selected to substantially balance the spherical aberration due to said reflective surfaces in the mutual imaging of said first focal surfaces.

14. An optical objective as defined in claim 13, and wherein said subsidiary conjugate focal surface in object space is imaged at said subsidiary conjugate focal surface in image space with magnification S, and said lenses are both of the same material and have respective powers of opposite sign, the ratio of the power of the object space lens to the power of the image space lens having a magnitude substantially equal to $S^2$.

15. An optical objective as defined in claim 14, and wherein the reflective surfaces and subsidiary conjugate focal surfaces are essentially symmetrical with respect to a plane perpendicular to the axis and intermediate the first and fourth reflective surfaces.

and said lenses are both of the same material and have respective powers that are substantially equal in magnitude and opposite in sign.

References Cited

UNITED STATES PATENTS

| | | | |
|---|---|---|---|
| 2,306,679 | 12/1942 | Warmisham | 350—294 |
| 2,327,947 | 8/1943 | Warmisham | 350—200 |
| 2,628,533 | 2/1953 | Oetjen | 350—55 |
| 2,662,187 | 12/1953 | Kavanagh | 350—294 X |
| 2,664,026 | 12/1953 | Kavanagh | 350—294 X |
| 2,682,197 | 6/1954 | Davis | 350—201 |
| 3,062,101 | 11/1962 | McCarthy | 350—55 |
| 3,112,355 | 11/1963 | Ross | 350—55 |
| 3,244,885 | 4/1966 | McHenry | 350—294 |

FOREIGN PATENTS 1,089,520  10/1954  France.

DAVID SCHONBERG, Primary Examiner

P. R. GILLIAM, Assistant Examiner

U.S. Cl. X.R.

350—27, 199